United States Patent
Li et al.

(10) Patent No.: US 12,100,028 B2
(45) Date of Patent: Sep. 24, 2024

(54) TEXT-DRIVEN AI-ASSISTED SHORT-FORM VIDEO CREATION IN AN ECOMMERCE ENVIRONMENT

(71) Applicant: Loop Now Technologies, Inc., San Mateo, CA (US)

(72) Inventors: Wu-Hsi Li, Somerville, MA (US); Jeremiah Kevin Tu, Sunnyvale, CA (US); Hong-Ming Tseng, Toronto (CA); Xiaochen Zhang, Shanghai (CN)

(73) Assignee: Loop Now Technologies, Inc., San Mateo, CA (US)

( * ) Notice: Subject to any disclaimer, the term of this patent is extended or adjusted under 35 U.S.C. 154(b) by 0 days.

(21) Appl. No.: 18/528,850

(22) Filed: Dec. 5, 2023

(65) Prior Publication Data
US 2024/0185306 A1 Jun. 6, 2024

Related U.S. Application Data

(60) Provisional application No. 63/604,261, filed on Nov. 30, 2023, provisional application No. 63/546,768, (Continued)

(51) Int. Cl.
*G06Q 30/0241* (2023.01)
*G06F 16/738* (2019.01)
(Continued)

(52) U.S. Cl.
CPC ....... *G06Q 30/0276* (2013.01); *G06F 16/739* (2019.01); *G06F 16/951* (2019.01); *G06F 40/295* (2020.01); *G06F 40/40* (2020.01)

(58) Field of Classification Search
CPC . G06Q 30/0276; G06F 16/739; G06F 16/951; G06F 40/295; G06F 40/40
See application file for complete search history.

(56) References Cited

U.S. PATENT DOCUMENTS 8,069,414 B2   11/2011   Hartwig et al.
8,244,707 B2   8/2012    Lin et al.
(Continued)

FOREIGN PATENT DOCUMENTS

KR   101606860 B1   3/2016

OTHER PUBLICATIONS

Automatic Video Programming using LSA and Audio Transcript Abdelkader Outtagarts, Member, IEEE, Abderrazagh Mbodj (Year: 2013).*

*Primary Examiner* — Alexandru Cirnu
(74) *Attorney, Agent, or Firm* — Adams Intellex, PLC

(57) ABSTRACT

Disclosed embodiments describe text-driven AI-assisted short-form video creation. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video. Media is extracted from the website included into the short-form video. The compiling includes a dynamically generated image.

26 Claims, 9 Drawing Sheets

Related U.S. Application Data filed on Nov. 1, 2023, provisional application No. 63/546,077, filed on Oct. 27, 2023, provisional application No. 63/536,245, filed on Sep. 1, 2023, provisional application No. 63/524,900, filed on Jul. 4, 2023, provisional application No. 63/522,205, filed on Jun. 21, 2023, provisional application No. 63/472,552, filed on Jun. 12, 2023, provisional application No. 63/464,207, filed on May 5, 2023, provisional application No. 63/458,733, filed on Apr. 12, 2023, provisional application No. 63/458,458, filed on Apr. 11, 2023, provisional application No. 63/458,178, filed on Apr. 10, 2023, provisional application No. 63/454,976, filed on Mar. 28, 2023, provisional application No. 63/447,918, filed on Feb. 24, 2023, provisional application No. 63/447,925, filed on Feb. 24, 2023, provisional application No. 63/443,063, filed on Feb. 3, 2023, provisional application No. 63/438,011, filed on Jan. 10, 2023, provisional application No. 63/437,397, filed on Jan. 6, 2023, provisional application No. 63/431,757, filed on Dec. 12, 2022, provisional application No. 63/430,372, filed on Dec. 6, 2022.

(51) Int. Cl.
  *G06F 16/951* (2019.01)
  *G06F 40/295* (2020.01)
  *G06F 40/40* (2020.01)

(56) References Cited

U.S. PATENT DOCUMENTS

| | | | |
|---|---|---|---|
| 8,572,490 | B2 | 10/2013 | Hartwig et al. |
| 9,118,712 | B2 | 8/2015 | McCoy et al. |
| 9,152,392 | B2 | 10/2015 | Petro et al. |
| 9,532,116 | B2 | 12/2016 | Terpe |
| 9,608,983 | B2 | 3/2017 | Fee |
| 9,645,700 | B2 | 5/2017 | Tsai |
| 9,693,013 | B2 | 6/2017 | Nesamoney et al. |
| 9,824,372 | B1 | 11/2017 | Seth et al. |
| 10,089,402 | B1 | 10/2018 | Winkler et al. |
| 10,496,350 | B2 | 12/2019 | Lazier et al. |
| 10,955,999 | B2 | 3/2021 | Lotinsky et al. |
| 11,075,891 | B1 | 7/2021 | Long et al. |
| 11,170,814 | B1 | 11/2021 | Rajauria et al. |
| 11,183,217 | B1 | 11/2021 | Liu et al. |
| 11,250,111 | B2 | 2/2022 | Goldston et al. |
| 11,250,399 | B2 | 2/2022 | Knock |
| 11,677,991 | B1* | 6/2023 | Balannik ............ H04N 21/8586 725/32 |
| 2010/0149359 | A1 | 6/2010 | Taoka |
| 2013/0021373 | A1 | 1/2013 | Vaught et al. |
| 2013/0097477 | A1 | 4/2013 | Adolf et al. |
| 2013/0145267 | A1 | 6/2013 | Ramachandran |
| 2013/0276021 | A1 | 10/2013 | Cho |
| 2014/0101537 | A1 | 4/2014 | Antkowiak et al. |
| 2014/0106881 | A1 | 4/2014 | Antkowiak et al. |
| 2014/0376876 | A1 | 12/2014 | Bentley et al. |
| 2015/0177940 | A1 | 6/2015 | Trevino et al. |
| 2015/0195175 | A1 | 7/2015 | Kariman |
| 2015/0213516 | A1 | 7/2015 | Jeremias |
| 2015/0278348 | A1 | 10/2015 | Paruchuri et al. |
| 2016/0065929 | A1 | 3/2016 | Barcons-Palau et al. |
| 2016/0088369 | A1 | 3/2016 | Terpe |
| 2016/0093105 | A1 | 3/2016 | Rimon et al. |
| 2017/0109584 | A1 | 4/2017 | Yao et al. |
| 2017/0269816 | A1 | 9/2017 | Bradley et al. |
| 2017/0270123 | A1* | 9/2017 | Jhamtani ............ G06F 16/4393 |
| 2018/0068019 | A1 | 3/2018 | Novikoff et al. |
| 2018/0132011 | A1 | 5/2018 | Shichman et al. |
| 2018/0253765 | A1 | 9/2018 | Avedissian et al. |
| 2018/0288396 | A1 | 10/2018 | Bouazizi et al. |
| 2021/0117471 | A1* | 4/2021 | Rav-Acha ............ G06F 16/7837 |
| 2021/0295324 | A1 | 9/2021 | Kerseboom et al. |
| 2021/0326852 | A1 | 10/2021 | Yantis et al. |
| 2021/0358038 | A1 | 11/2021 | Vandenberg et al. |
| 2021/0390531 | A1 | 12/2021 | Voorhees et al. |
| 2021/0398095 | A1 | 12/2021 | Mallett et al. |
| 2021/0406920 | A1 | 12/2021 | McLancy |
| 2022/0132179 | A1* | 4/2022 | Bennett-James ...... G06V 40/20 |

* cited by examiner

TEXT-DRIVEN AI-ASSISTED SHORT-FORM VIDEO CREATION IN AN ECOMMERCE ENVIRONMENT

RELATED APPLICATIONS

This application claims the benefit of U.S. provisional patent applications "Text-Driven AI-Assisted Short-Form Video Creation In An Ecommerce Environment" Ser. No. 63/430,372, filed Dec. 6, 2022, "Temporal Analysis To Determine Short-Form Video Engagement" Ser. No. 63/431,757, filed Dec. 12, 2022, "Connected Television Livestream-To-Mobile Device Handoff In An Ecommerce Environment" Ser. No. 63/437,397, filed Jan. 6, 2023, "Augmented Performance Replacement In A Short-Form Video" Ser. No. 63/438,011, filed Jan. 10, 2023, "Livestream With Synthetic Scene Insertion" Ser. No. 63/443,063, filed Feb. 3, 2023, "Dynamic Synthetic Video Chat Agent Replacement" Ser. No. 63/447,918, filed Feb. 24, 2023, "Synthesized Realistic Metahuman Short-Form Video" Ser. No. 63/447,925, filed Feb. 24, 2023, "Synthesized Responses To Predictive Livestream Questions" Ser. No. 63/454,976, filed Mar. 28, 2023, "Scaling Ecommerce With Short-Form Video" Ser. No. 63/458,178, filed Apr. 10, 2023, "Iterative AI Prompt Optimization For Video Generation" Ser. No. 63/458,458, filed Apr. 11, 2023, "Dynamic Short-Form Video Transversal With Machine Learning In An Ecommerce Environment" Ser. No. 63/458,733, filed Apr. 12, 2023, "Immediate Livestreams In A Short-Form Video Ecommerce Environment" Ser. No. 63/464,207, filed May 5, 2023, "Video Chat Initiation Based On Machine Learning" Ser. No. 63/472,552, filed Jun. 12, 2023, "Expandable Video Loop With Replacement Audio" Ser. No. 63/522,205, filed Jun. 21, 2023, "Text-Driven Video Editing With Machine Learning" Ser. No. 63/524,900, filed Jul. 4, 2023, "Livestream With Large Language Model Assist" Ser. No. 63/536,245, filed Sep. 1, 2023, "Non-Invasive Collaborative Browsing" Ser. No. 63/546,077, filed Oct. 27, 2023, "AI-Driven Suggestions For Interactions With A User" Ser. No. 63/546,768, filed Nov. 1, 2023, and "Customized Video Playlist With Machine Learning" Ser. No. 63/604,261, filed Nov. 30, 2023.

Each of the foregoing applications is hereby incorporated by reference in its entirety.

FIELD OF ART

This application relates generally to video creation and more particularly to text-driven AI-assisted short-form video creation in an ecommerce environment.

BACKGROUND

Ecommerce (electronic commerce) includes activities associated with the buying and selling of goods and services on the Internet. Ecommerce can include systems and tools for online buyers and sellers, such as mobile shopping platforms and online payment systems. Ecommerce has changed the way people buy and sell goods and services, and there are a variety of types of ecommerce today. Once such type is business-to-consumer (B2C) ecommerce. B2C ecommerce involves transactions made between a business and consumers. B2C is one of the most popular sales models in the ecommerce space. Purchasing cosmetics from an online retailer is an example of a B2C ecommerce transaction. Another form of ecommerce is customer-to-customer (C2C) ecommerce. This involves consumers selling directly to each other, such as with an online auction. Yet another form of ecommerce is direct-to-consumer (D2C), in which manufacturers sell directly to end consumers, with no intermediary. Regardless of the ecommerce type, ecommerce is now an essential part of most any strategy in the sale of goods and services.

As with other forms of commerce, ecommerce uses advertising and marketing strategies designed to bring attention to products and services within the marketplace. Advertising has a long history in many cultures, from early Egyptian sales messages and wall posters printed on papyrus to political campaign displays found in Ancient Greece and Rome. Even in cultures that were less literate, town criers were used to inform potential buyers of goods and services for sale. Trademarks were used some 1,300 years BC in India to show customers which artisan or family had crafted pieces of pottery. Advertising in newspaper and magazines appeared in Venice during the $16^{th}$ century, and the practice soon spread to Germany, Holland, and Britain. By the 1800s, Paris newspapers were selling advertising space in their editions in order to keep the price of production low. In modern times, large companies now employ whole departments of staff to manage and design advertising pieces and plan strategies to put their messages across to consumers and other businesses. Psychologists help to design advertising to target specific groups of buyers and appeal more effectively to the emotions of love, hate, and fear in order to attract consumers. Electronic media ads are commonplace. Television, radio, feature films and short films are all used as media for advertising and marketing campaigns. Television commercials can cost millions of dollars to produce and distribute. A 30-second slot of time in a recent popular annual sporting contest cost seven million dollars. Social networks are paid for primarily by advertising. Over eighty percent of one company's revenue came from ecommerce ads in recent years. Another company generated over thirty-one billion dollars in advertising revenue in a single year. Well over ninety percent of revenue of two of the popular social media platforms comes from advertising as well. Ecommerce advertising is not all generated by professional companies or manufacturers. Ecommerce consumers can discover and be influenced to purchase products or services based on recommendations from friends, peers, and trusted sources (like influencers) on various social networks. This discovery and influence can take place via posts from influencers and tastemakers, as well as friends and other connections within the social media systems. In many cases, influencers are paid for their efforts by website owners or advertising groups. Regardless of the methods used, marketing and advertising continue to be a part of life in our modern world of buying and selling.

Summary

Short-form videos are useful tools in the promotion of goods and services. An important aspect of any type of promotion is timeliness. Being late in getting the message out to the public about a good or service can result in lost market share and reduced revenue. Creating compelling content can be time consuming. Even a 30 second short-form video can take days to record and edit. Thus, tools and techniques for accelerating the process of creating short-form videos can serve to reduce the time required to create effective short-form videos. This can enable a faster dissemination of promotional content that can be essential for a successful marketing campaign. However, simply getting a video disseminated on social media as quickly as possible is not sufficient for a successful marketing campaign. The content of short-form videos must be engaging in order to effectively deliver the intended message about a good or service. By harnessing the power of artificial intelligence (AI), media assets can be selected from an ever-growing pool of assets that is too large for one person, or even a sizeable team, to adequately review. Using the techniques of disclosed embodiments, it is possible to create effective and engaging content in a timely manner.

Disclosed embodiments provide techniques for video analysis that harness the power of the vast library of existing digital content. Text from websites is extracted, and summary sentences are created based on natural language processing (NLP). The summary sentences are ranked, and video scenes are generated based on the summary sentences. Media assets are selected from a media asset library, and the media assets are compiled together to create a new short-form video. The selection is accomplished by machine learning. The resulting short-form video can be used in the promotion of goods and services. By reducing the time required to generate such short-form videos, improvements in ecommerce can be realized.

Disclosed embodiments describe text-driven AI-assisted short-form video creation. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video. Media is extracted from the website and included in the short-form video. The compiling includes a dynamically generated image.

A computer-implemented method for video analysis is disclosed comprising: extracting text, using one or more processors, from a website to generate extracted text; forming, from the extracted text, possible summary sentences, wherein the forming is based on natural language processing; ranking the possible summary sentences according to an engagement metric; picking summary sentences from the possible summary sentences based on a threshold engagement metric value; generating a list of video scenes based on the summary sentences, wherein each video scene is associated with a summary sentence; choosing a media asset, from a media asset library, for each video scene within the list of video scenes, wherein the choosing is accomplished by machine learning; and compiling the list of video scenes, including the media asset that was chosen for each video scene, in a short-form video. Some embodiments comprise extracting media from the website. Some embodiments comprise including the media that was extracted into the short-form video. In embodiments, the compiling includes a dynamically generated image in the short-form video. In embodiments, the dynamically generated image includes a synthesized video. Some embodiments comprise selecting a video template, from a library of video templates, wherein the video template is a base into which the list of video scenes is compiled.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Creating compelling content can be a time-consuming endeavor. Recording and editing video, images, audio, and text can require many iterations before an acceptable final version is ready. In the fast-paced world of ecommerce, an extended creation time for short-form videos can adversely impact the effectiveness of product promotions. A delay in getting the word out about a product or service can result in lost sales opportunities. This can ultimately cause a reduction in market share, and/or lost revenue.

Disclosed embodiments address the issue of the time required to create a short-form video by leveraging the vast library of existing media assets. These media assets can include short-form videos, still images, audio clips, text, synthesized videos, and more. Relevant media assets are selected and presented to a user in a sequence that enables accelerated creation of videos, such as short-form videos, for the purposes of product promotion. Thus, disclosed embodiments improve the technical field of video generation.

Techniques for video analysis are disclosed. A website or other content source can be selected by a user as an initial seed for the creation of a short-form video. The website can include text, images, videos, audio clips, and/or other media assets. The text of the website can be scraped, extracted, and analyzed via natural language processing (NLP) techniques. The NLP techniques can include entity detection and creation of summary sentences. Multiple summary sentences may be created. The summary sentences can be ranked based on an engagement metric value. The engagement metric value can be based on heuristics and/or machine learning. The higher ranked summary sentences are then used to generate a list of video scenes. The video scenes can be denoted by a text phrase or sentence describing a scene. Media assets are chosen from a media asset library and associated with the video scenes. The media assets are selected based on the video scenes. Multiple media assets can be obtained for each video scene. A user, such as a content creator, can conveniently review the multiple media assets and select the media asset(s) that he/she feels would best represent the video scene. This process can be repeated for multiple scenes. Once the media assets are selected, they are compiled into a short-form video. This can greatly reduce the time required to create compelling and effective product promotion via short-form video creation and dissemination.

Figure 1:
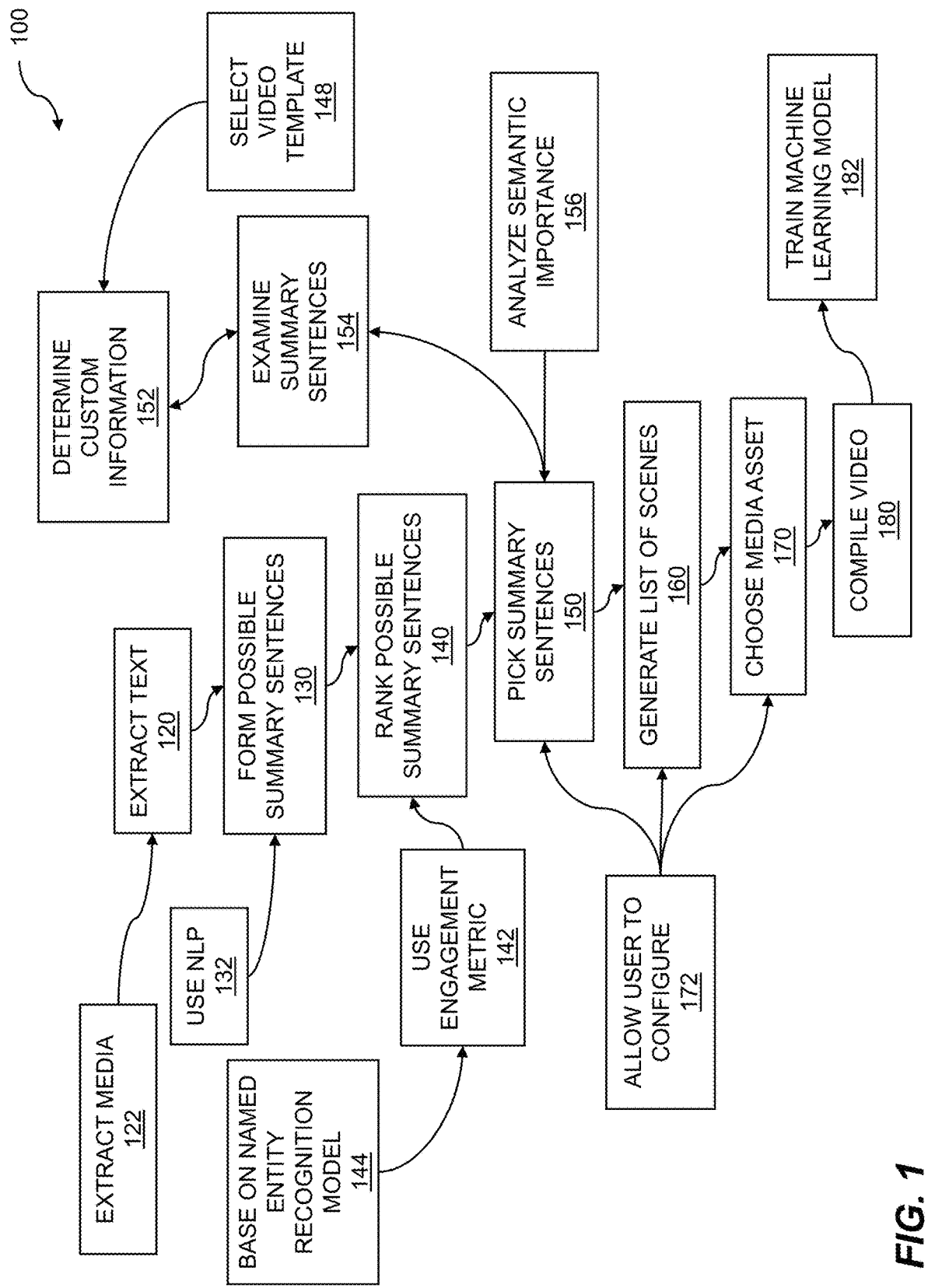
FIG. 1 is a flow diagram for text-driven AI-assisted short-form video creation in an ecommerce environment.

FIG. 1 is a flow diagram for text-driven AI-assisted short-form video creation in an ecommerce environment. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video. The flow 100 starts with extracting media 122 from a website. The media that was extracted can be included in the short-form video. The extracting can include extracting text 120. The text can be extracted using a web crawler. The web crawler may be used to read HTML pages associated with a URL. The extracted text can include ASCII format text, UTF-8 text, Unicode text, and/or other suitable text formats. The flow 100 continues with forming possible summary sentences 130. The forming of summary sentences can be accomplished with natural language processing (NLP) 132. The NLP may include tokenization, word frequency analysis, and/or computing a normalized word frequency analysis. In some embodiments, sentences and/or phrases may be scored based on the normalized word frequency analysis. Phrases that score higher than a predetermined threshold may be selected as possible summary sentences. In embodiments, the forming of summary sentences may include additional preprocessing of the text. The additional preprocessing can include a stemming process to reduce words into their root forms. As an example, the words "cleaning" and "cleaned" may be reduced to the root word "clean". Additionally, a list of stop words may be used for further scrubbing the text by removing commonly used words such as articles, prepositions, and pronouns. Embodiments can further include computing sentence thresholds. Each sentence can be scored, and an average sentence score can be computed. Sentences with a score above a predetermined threshold (e.g., scoring in the top quartile) are selected as summary sentences. The forming of possible summary sentences can be based on contextual information from the website. As an example, if a given website is known to be sports related, then terms such as "bat" can be weighted towards the meaning of a baseball bat, rather than the flying mammal. In this way, the contextual information from the website can be used for disambiguation processing.

The flow 100 continues with ranking possible summary sentences 140. In embodiments, the ranking can include using an engagement metric 142. In embodiments, the engagement metric can be based on a list of trending words, phrases, and/or topics. The list of trending words may be obtained from a search engine, or may be derived from scraping popular websites. An engagement score may be derived by adding a point for each word in the sentence that is deemed to be a trending word. Thus, a sentence or phrase that includes three trending words may have an engagement score of three, while a sentence that contains no trending words may have an engagement score of zero. In some embodiments, the engagement metric is based on a named entity recognition model 144. The named entity recognition model 144 can include words such as a brand name or the name of a celebrity. Embodiments can include recognizing that a celebrity is named in the possible summary sentences, wherein the engagement metric is increased. The engagement metric can be based on an image of a celebrity in the website. In embodiments, the image of the celebrity is identified using machine-learning based on facial recognition.

When a sentence or phrase includes a named entity recognition word, it may be scored with two points for each named entity. The scoring for named entities can be weighted with a coefficient, where the coefficient is a function of the popularity of a named entity. As an example, when a sentence or phrase includes a very popular celebrity, it may be scored higher due to a higher coefficient for the named entity corresponding to the popular celebrity, as compared with a celebrity from several years previous who is not currently as popular. The named entity associated with the celebrity from several years previous may have a lower coefficient than that for the named entity corresponding to the currently popular celebrity. In embodiments, the engagement metric is based on metadata associated with the website. The metadata can include hashtags, repost velocity, participant attributes, participant history, ranking, purchase history, view history, or participant actions.

The flow 100 continues with picking summary sentences 150. The user may pick summary sentences that he/she wishes to use as the basis of generating a list of scenes 160. One or more media assets are presented to the user for each scene. The user chooses a media asset 170 for each scene. The media assets can comprise one or more images. The media assets can comprise one or more short-form videos. The media assets can include audio clips, computer-generated text, animations, animated GIFs, or other suitable media types. The media asset can be a blank. The blank can be a monochromatic image, such as a "black screen" or the like. The selected media assets are compiled into a video 180. The video can be a short-form video. Disclosed embodiments can serve as a "wizard" that guides a user through the creation process, saving countless hours compared with traditional methods, while still leaving ample opportunity for customization. In this way, short-form video content is quickly created using AI and ML techniques, while still allowing for customization to enable the creation of relevant short-form video content. The compiling can include a dynamically generated image in the short-form video. The dynamically generated image can include a synthesized video.

In embodiments, the synthesized videos are created using a generative model. Generative models are a class of statistical models that can generate new data instances. The generative model can include a generative adversarial network (GAN). A generative adversarial network (GAN) includes two parts. A generator learns to generate plausible data. The generated instances are input to a discriminator. The discriminator learns to distinguish the generator's fake data from real data. The discriminator penalizes the generator for generating implausible results. During the training process, over time, the output of the generator improves, and the discriminator has less success distinguishing real output from fake output. The generator and discriminator can be implemented as neural networks, with the output of the generator connected to the input of the discriminator. Embodiments may utilize backpropagation to create a signal that the generator neural network uses to update its weights.

The discriminator may utilize training data coming from two sources, real data, which can include images of real objects (people, dogs, motorcycles, etc.), and fake data, which are images created by the generator. The discriminator uses the fake data as negative examples during the training process. A discriminator loss function is used to update weights via backpropagation for discriminator loss when it misclassifies an image. The generator learns to create fake data by incorporating feedback from the discriminator. Essentially, the generator learns how to "trick" the discriminator into classifying its output as real. A generator loss function is used to penalize the generator for failing to trick the discriminator. Thus, in embodiments, the generative adversarial network (GAN) includes two separately trained networks. The discriminator neural network can be trained first, followed by training the generative neural network, until a desired level of convergence is achieved. In embodiments, multiple synthesized images may be included in a sequence to form a synthesized video.

In some embodiments, the generative model includes a variational autoencoder (VAE). The VAE is an autoencoder with an encoding distribution that is regularized during the training to ensure that its latent space has good properties for generation of new data. An autoencoder includes an encoder and a decoder in series to perform dimensionality reduction. The VAE encodes input as a distribution over latent space, and utilizes backpropagation based on reconstruction error induced by the decoder. Thus, variational autoencoders (VAEs) are autoencoders that address the problem of the latent space irregularity by making the encoder return a distribution over the latent space instead of a single point, and by incorporating in the loss function a regularization term over that returned distribution. This ensures a better organization of the latent space.

In some embodiments, the generative model includes a flow-based model. Flow-based models can provide the capabilities of density calculation and sampling. After learning a mapping between probability distributions, flow-based models can exactly compute the likelihood that any given sample was drawn from the target distribution. They can also generate new samples from the target distribution. In some embodiments, the generative model includes an autoregressive model. An autoregressive model is a time-series model that describes how a particular variable's past values influence its current value. That is, an autoregressive model attempts to predict the next value in a series by incorporating the most recent past values and using them as input data. In some embodiments, the generative model includes latent diffusion. Latent diffusion models can accelerate diffusion by operating in a lower-dimensional latent space. Latent diffusion models may have a more stable training phase than GANs and less parameters than autoregressive models. Other techniques for synthesized video generation may be used in disclosed embodiments.

The flow 100 can include selecting a video template 148. The video template can include a set of rules and guidelines for video creation. The video template can include a duration field, indicating the number of seconds in duration that the generated short-form video should play. The video template can include a transition list, indicating the types of transitions that are to be used to segue from one media asset to another. As an example, the transitions can include wipes, fades, dissolves, and the like. In some embodiments, the transitions may be randomly selected from the transition list. In other embodiments, the transitions may be applied in the order that they are specified in the transition list. The video template can include a size field, indicating the maximum size, in kilobytes, that the generated short-form video should be. In some embodiments, if the generated short-form video exceeds the specified maximum size, transcoding may be performed on one or more of the media assets used in the generated short-form video to further compress and/or lower the resolution of the media assets to meet the file size requirement set forth in the template. The video template can include a resolution field, indicating the resolution that the generated short-form video should be. The video template can include an orientation field, indicating the orientation (landscape or portrait) in which the generated short-form video should be played. The video template can include other options, such as if background music should be included in the video; if subtitles should be rendered onto the video, and in what language; a numerical range for the number of scenes the short-form video should have; and/or other video creation options. While the use of a video template is not required for disclosed embodiments, using a template with the desired settings can expedite short-form video creation, since many of the desired options are preselected via the template. Embodiments can include selecting a video template, from a library of video templates, wherein the video template is the base into which the list of video scenes are compiled, and can further include determining custom information required in the video template. Embodiments can further include examining the summary sentences to provide the custom information. The examining can be accomplished by machine learning.

Embodiments may include determining custom information 152. The custom information can include setting of one or more of the aforementioned template options, such as video duration, video orientation, etc. The flow can include examining the summary sentences 154, and editing the video template based on the examination of the summary sentences. The examination of the summary sentences can be performed by machine learning. The machine learning can also perform analyzing the semantic importance of the summary sentences 156. Picking summary sentences can include analyzing the semantic importance of the possible summary sentences. The analyzing of semantic importance can include disambiguation and identification of hypernyms, hyponyms, synonymy, antonymy, and/or other lexical semantics. In some embodiments, the semantic importance can be used to further cull the list of summary sentences prior to presenting them to a user. In embodiments, the picking summary sentences comprises a single summary sentence.

The flow 100 can include allowing a user to configure 172 various aspects of the video creation process. The configuring can include the picking of the summary sentences 150. Sentences can be added, edited, or removed as desired by the user. The configuring can include editing the generated list of scenes. Scenes can be added, removed, edited, and/or reordered, as desired by the user. The configuring can include choosing a media asset. The user may opt to manually import media assets for compilation into the generated short-form video. Disclosed embodiments enable a feature in which the user augments a search from the media asset library.

Embodiments can include training a machine learning model 182, for the machine learning, with videos that were previously compiled. The machine learning model may use as its input the media assets. In some embodiments, each media asset has a unique alphanumeric identifier associated with it. The machine learning model can use the unique alphanumeric identifier, along with additional metadata, in order to recognize patterns of usage among the media assets. The additional metadata can include topic information, product information, author information, and so on.

Various steps in the flow 100 may be changed in order, repeated, omitted, or the like without departing from the disclosed concepts. Various embodiments of the flow 100 can be included in a computer program product embodied in a non-transitory computer-readable medium that includes code executable by one or more processors.

Figure 2:
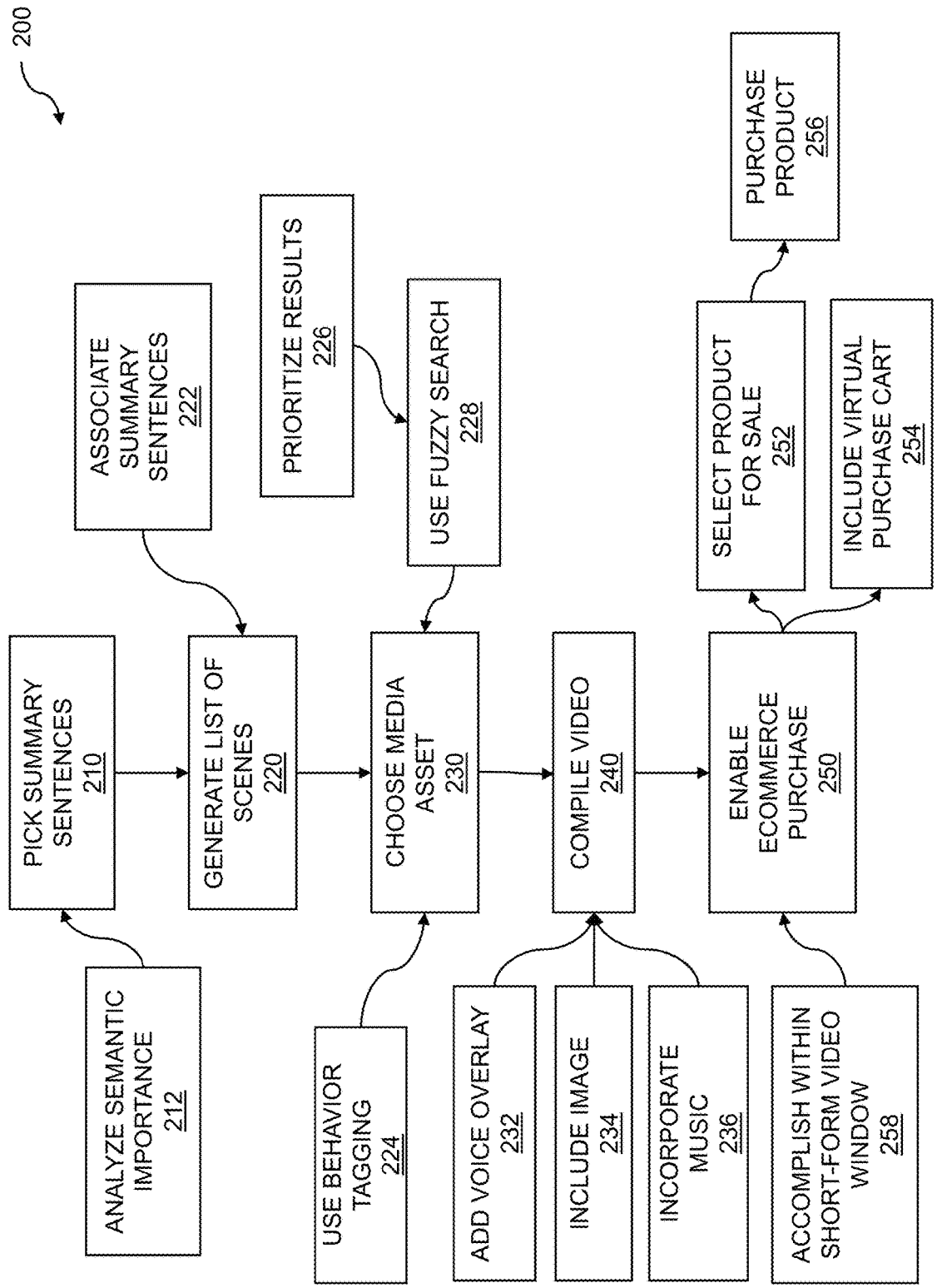
FIG. 2 is a flow diagram for enabling short-form video creation in an ecommerce environment.

FIG. 2 is a flow diagram for enabling short-form video creation in an ecommerce environment. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video.

The flow 200 includes picking summary sentences 210. Disclosed embodiments may automatically pick summary sentences to use as the basis of generating a list of scenes 220. The flow can include analyzing semantic importance 212 of summary sentences. The analyzing of semantic importance can include disambiguation identification of hypernyms, hyponyms, synonymy, antonymy, and/or other lexical semantics. The flow can include associating summary sentences 222 with scenes. As an example, if four summary sentences are picked, there may be four corresponding scenes. For each scene in the list of scenes, a media asset is chosen 230. In some embodiments, choosing a media asset can comprise using a fuzzy search 228 of the media asset library, and can further include prioritizing results 226 of the fuzzy search. Fuzzy searching retrieves terms that match closely instead of exactly. The fuzzy search can include synonyms, slang, and/or common misspellings of words as search results based on an input word. As an example, fuzzy searching for videos that include scissors can include search results for scissors, shears, snips, and cutters, as well as common misspellings, such as "sizzers". In this way, a wider range of media assets can be obtained and presented to a user for potential inclusion in a short-form video. Choosing a media asset is based on behavior tagging 224 in some embodiments. Videos can be tagged based on what they contain. The tagging can be included in metadata that is associated with a video file, and/or included in a video library as a cross-referenced table. The videos can be tagged based on machine learning, and/or human curation and classification of the videos. Once all the media assets are selected, the media assets are compiled into a video 240. The video can be a short-form video. The compiled short-form video may be further customized. The customizing can include, but is not limited to, adding a voice overlay 232, including a still image 234, incorporating music 236, and/or incorporating other sound and/or visual effects. The visual effects can include transitions used to segue from one media asset to a following media asset. The transitions can include fades, slides, wipes, dissolves, and so on. The visual effects can help create more engaging content that can enhance entertainment value.

Embodiments can include enabling an ecommerce purchase 250 within the short-form video that was compiled, wherein the ecommerce purchase is accomplished within the short-form video that was compiled. The enabling can include a virtual purchase cart 254. Some embodiments enable the feature of selecting a product for sale 252 based on the summary sentences or the media assets. A purchase of the product 256 for sale by the user can include a representation of the product in an on-screen product card. The on-screen product card may include text, a picture, a line drawing, an icon, or an emoji. In some embodiments, the short-form video that was compiled displays the virtual purchase cart while the short-form video plays. In some cases, the virtual purchase cart covers a portion of the short-form video that was compiled.

A product card is a graphical element such as an icon, thumbnail picture, thumbnail video, symbol, or other suitable element that is displayed in front of the video. The product card is selectable via a user interface action such as a press, swipe, gesture, mouse click, verbal utterance, or other suitable user action. When the product card is invoked, an additional on-screen display is rendered over a portion of the video while the video continues to play. This enables a user to accomplish purchase of a product/service within a short-form video window 258 while preserving a continuous video playback session. In other words, the user is not redirected to another site or portal that causes the video playback to stop. Thus, users are able to initiate and complete a purchase completely inside of the video playback user interface, without being directed away from the currently playing video. Allowing the video to play during the purchase can enable improved audience engagement, which can lead to additional sales and revenue, one of the key benefits of disclosed embodiments. In some embodiments, the additional on-screen display that is rendered upon selection or invocation of a product card conforms to an Interactive Advertising Bureau (IAB) format. A variety of sizes are included in IAB formats, such as for a smartphone banner, mobile phone interstitial, and the like.

In embodiments, the ecommerce purchase is accomplished within the short-form video. The enabling can include rendering a product card associated with the product. The enabling can include revealing a virtual purchase cart that supports checkout, including specifying various payment methods, and applying coupons and/or promotional codes. In some embodiments, the payment methods can include fiat currencies such as USD, as well as virtual currencies, including cryptocurrencies such as Bitcoin. In some embodiments, more than one object (product) may be highlighted and enabled for ecommerce purchase. When multiple items are purchased via product cards during the playback of a short-form video, the purchases may be cached until termination of the video, at which point the orders are processed as a batch. The termination of the video can include the user stopping playback, the user exiting the video window, the livestream ending, or a prerecorded video ending. The batch order process can enable a more efficient use of computer resources, such as network bandwidth, by processing the orders together as a batch instead of processing each order individually.

Various steps in the flow 200 may be changed in order, repeated, omitted, or the like without departing from the disclosed concepts. Various embodiments of the flow 200 can be included in a computer program product embodied in a non-transitory computer-readable medium that includes code executable by one or more processors.

Figure 3:
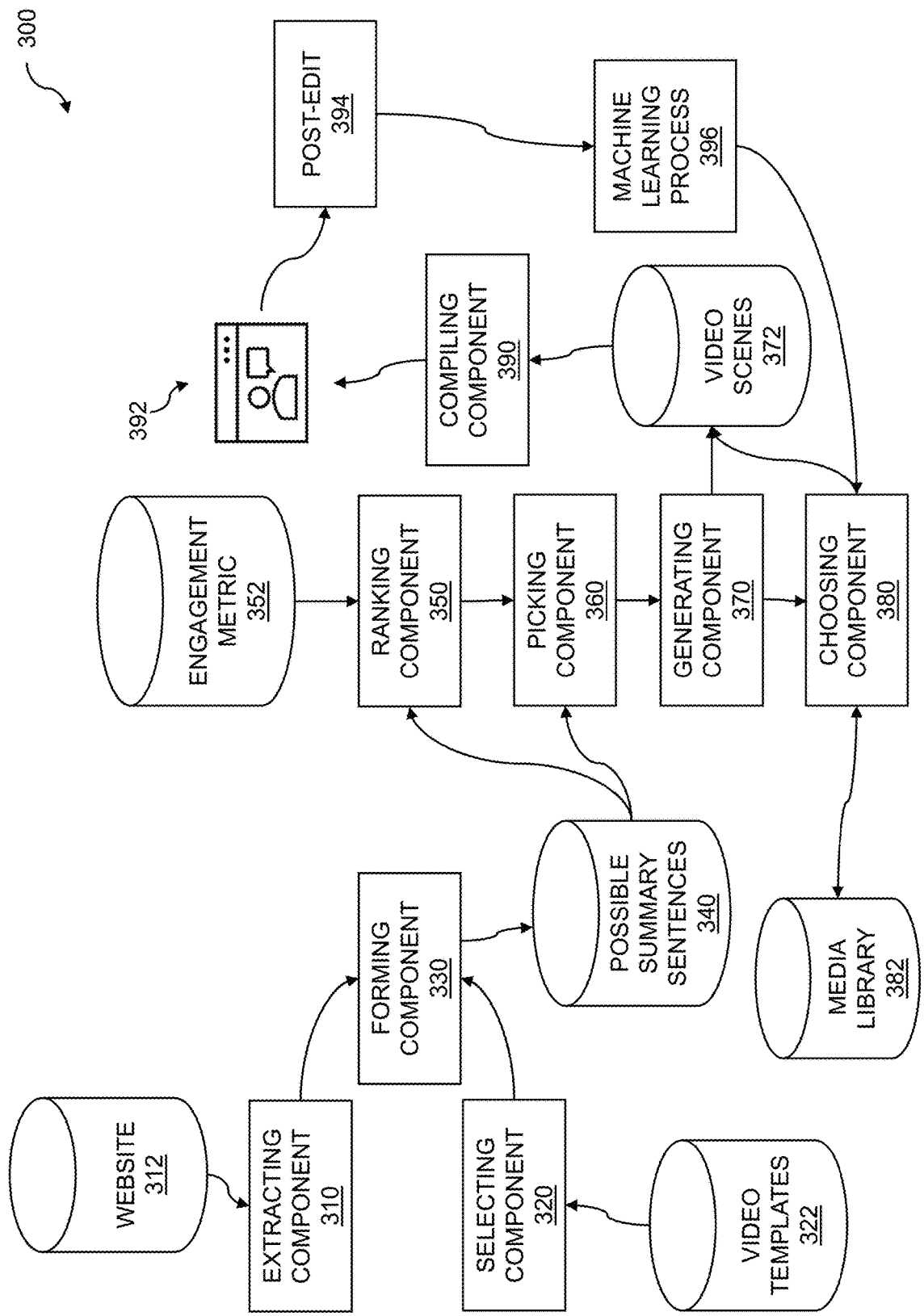
FIG. 3 is an infographic for text-driven AI-assisted short-form video creation in an ecommerce environment.

FIG. 3 is an infographic for text-driven AI-assisted short-form video creation in an ecommerce environment. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video.

In the infographic 300, a website 312 can be specified via a URL, IP address, or other suitable technique. A short-form video is generated based on the website 312. Thus, the website 312 can serve as a "seed" or starting point for creation of the short-form video. The extracting component 310 ingests text on the website. In some embodiments, the extracting component may extract text from multiple pages on the website. The text can be ASCII text, UTF-8 text, Unicode text, or another suitable format. The text can be roman text, Cyrillic text, kanji, hiragana, katakana, and/or other character sets and/or text types. In some embodiments the extracting component 310 extracts other elements besides text, including other media assets. The other media assets can include other videos, still images, animated GIFs, and audio files. The audio files can include podcasts. In embodiments, extracting text is performed within a podcast. The extracting of text may be accomplished by automatic speech recognition (ASR).

In the infographic 300, a video template library 322 may be used for storing video templates with predefined settings for a variety of short-form videos. The predefined settings can include duration, orientation, and resolution, amongst other settings. As examples, a user who desires to make a short-form video intended for viewing on smartphones may select a video template that has 720p resolution and a vertical (portrait) orientation. In contrast, a user who desires to make a short-form video intended for viewing on tablet computers may select a video template that has 4K resolution and a horizontal (landscape) orientation. Embodiments can include templates for a variety of platforms, including, but not limited to, a smartphone, a tablet computer, a laptop computer, a television, and/or a smartwatch. Since a smartwatch typically may have a smaller display area than a smartphone, the video template may specify a lower resolution, and/or include heuristics such as elimination of text in a short-form video targeted for display on a smartwatch, since text can be difficult to read on a smartwatch. Another template can include a "half phone" template. The half phone template can be used to generate a short-form video that is well suited for viewing on one half of a foldable smartphone. As an example, the video size specified in the half phone template can be a square image format, which may more closely align with the displayable area of a smartphone when it is in a folded configuration. Other video templates for other devices and/or platforms can also be included in some embodiments. A selecting component 320 may automatically select a video template from the video template library 322. The automatic selection can be based on default settings, a previously used video template, and/or context information from the website 312 that is being used as the seed for the short-form video that is to be created. A forming component 330 forms possible summary sentences. The forming can be based on contextual information from the website 312. As an example, if a website is a culinary website, then summary sentences that have words pertaining to foods can be ranked higher than sentences that do not have any words pertaining to foods. Using contextual information, a higher quality of possible summary sentences can be obtained. The possible summary sentences can be obtained using an NLP process. The NLP process can include a preprocessing phase in which lexical techniques such as stemming and stop word removal are applied. The NLP process can further include word frequency analysis and scoring of sentences. Based on the scoring, one or more summary sentences are loaded into a database of possible summary sentences 340.

In the infographic 300, a ranking component 350 ranks the possible summary sentences 340. The ranking can be based on an engagement metric 352. In embodiments, the engagement metric can be based on a list of trending words, phrases, and/or topics. The list of trending words may be obtained from a search engine, or derived from scraping popular websites such as news websites. An engagement score may be derived by adding a point for each word in the sentence that is deemed to be a trending word. Thus, a sentence or phrase that includes three trending words may have an engagement score of three, while a sentence that contains no trending words may have an engagement score of zero. In some embodiments, the engagement metric is based on a named entity recognition model. The named entity recognition model can include words such as a brand name or the name of a celebrity. This can further include recognizing that a celebrity is named in the possible summary sentences, wherein the engagement metric is increased. The engagement metric can be based on an image of a celebrity in the website. In some embodiments, the engagement metric 352 may be updated on a periodic basis. Since news and trends can change quickly, the engagement metric may be computed daily or hourly, to promote relevant summary sentences for inclusion in short-form videos. In embodiments, the image of the celebrity is identified using machine-learning based facial recognition. A picking component 360 picks summary sentences to use as the basis for scenes within a short-form video. The picking can be based on a threshold engagement metric value. As an example, if a sentence has a score in the top quartile of all sentences within a website, it may be picked by the picking component 360. In embodiments, a user has the opportunity to customize the selections output by the picking component. This can include editing, adding, deleting, and/or reordering summary sentences that are used for video scenes 372. The generating component 370 generates a list of video scenes based on the summary sentences, wherein each video scene is associated with a summary sentence. In embodiments, the list of video scenes can be based on the highest ranked summary sentences. Once the video scenes are established, the choosing component 380 searches the media library 382 for relevant media assets. In some embodiments, the choosing component may select multiple media assets for each scene, and may also allow a user to edit the selection of media assets, which can include adding a media asset, deleting a media asset, and/or reordering the sequence of media assets.

In the infographic 300, once the media assets that correlate to each scene are obtained, the compiling component 390 encodes a short-form video 392 that utilizes the media assets provided by the choosing component 380. Optionally, the short-form video 392 can be sent to a post-edit process 394, where a user can further edit the short-form video 392. The results of the editing can be input to machine learning process 396. The machine learning process 396 can be trained by the post-edit results to further refine the operation of the choosing component 380. As an example, if a media asset that is selected by the choosing component 380 is frequently deleted by the post-edit process, the machine learning process 396 recognizes that pattern after a period of time. Then, during the creation of future short-form videos, that frequently deleted media asset is not selected by the choosing component. In this way, disclosed embodiments continuously adapt to user feedback, leading to generated short-form videos that require less post-edit processing, and further accelerating the dissemination of short-form videos, which is essential in the field of ecommerce.

Figure 4:
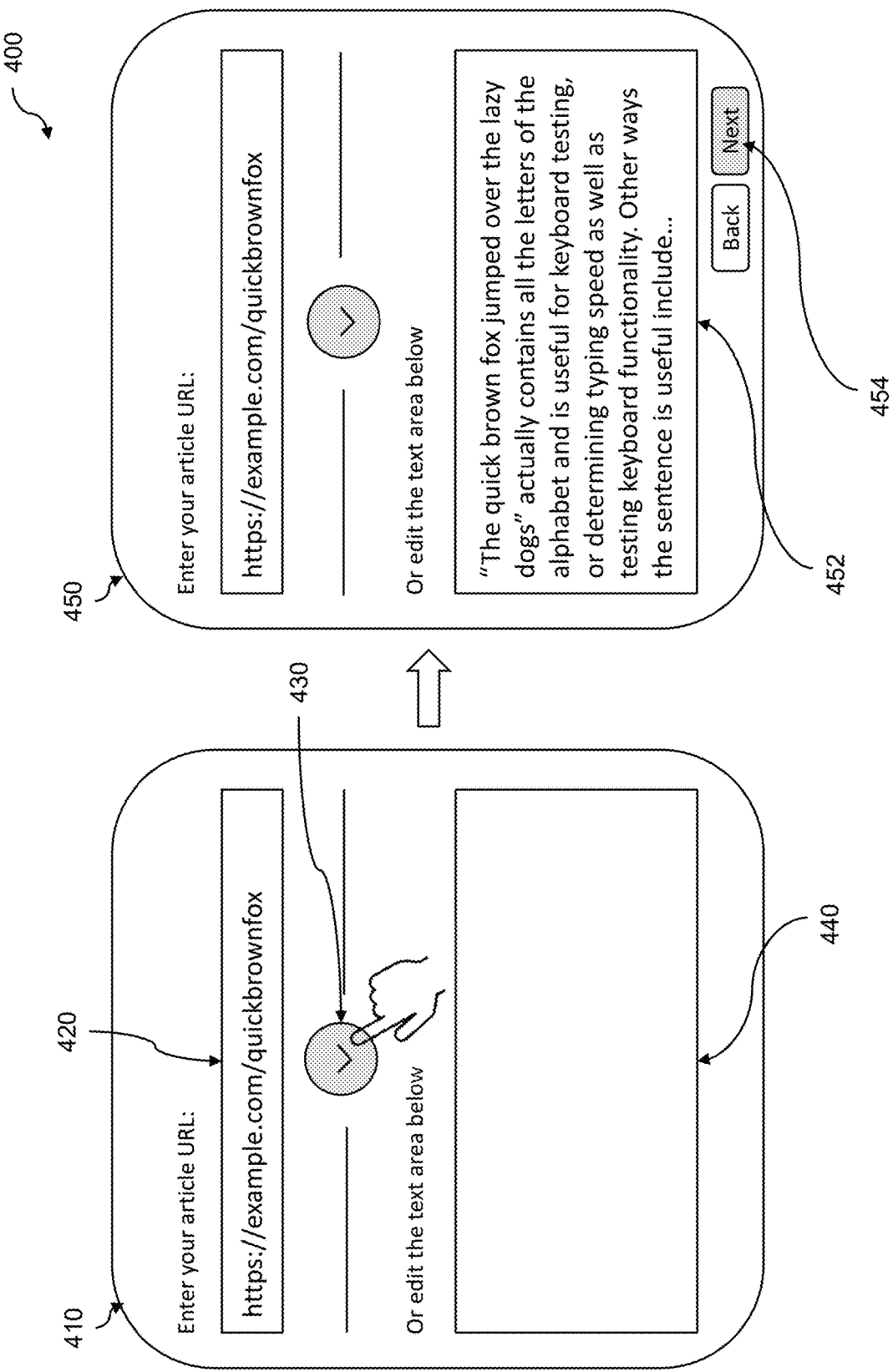
FIG. 4 is a diagram showing extracting text from a website.

FIG. 4 is a diagram showing extracting text from a website. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video. In the diagram 400, a user interface 410 may include a URL field 420. A user can enter a website URL, IP address, or other designator that can be used to specify a network location of a website. The website may include one or more HTML pages, text files, or other files that contain text to be summarized. Alternatively, a user may paste text directly into text field 440, instead of specifying a URL in field 420. The pasted text is then analyzed in a similar manner as text from the website specified at field 420. Continuing with the example, the user selects the processing button 430, which causes the system to create summary sentences which are shown in text field 452 in user interface 450. The user can then invoke the Next button 454 to continue the short-form video generation process using the summary text shown in text field 452.

Figure 5:
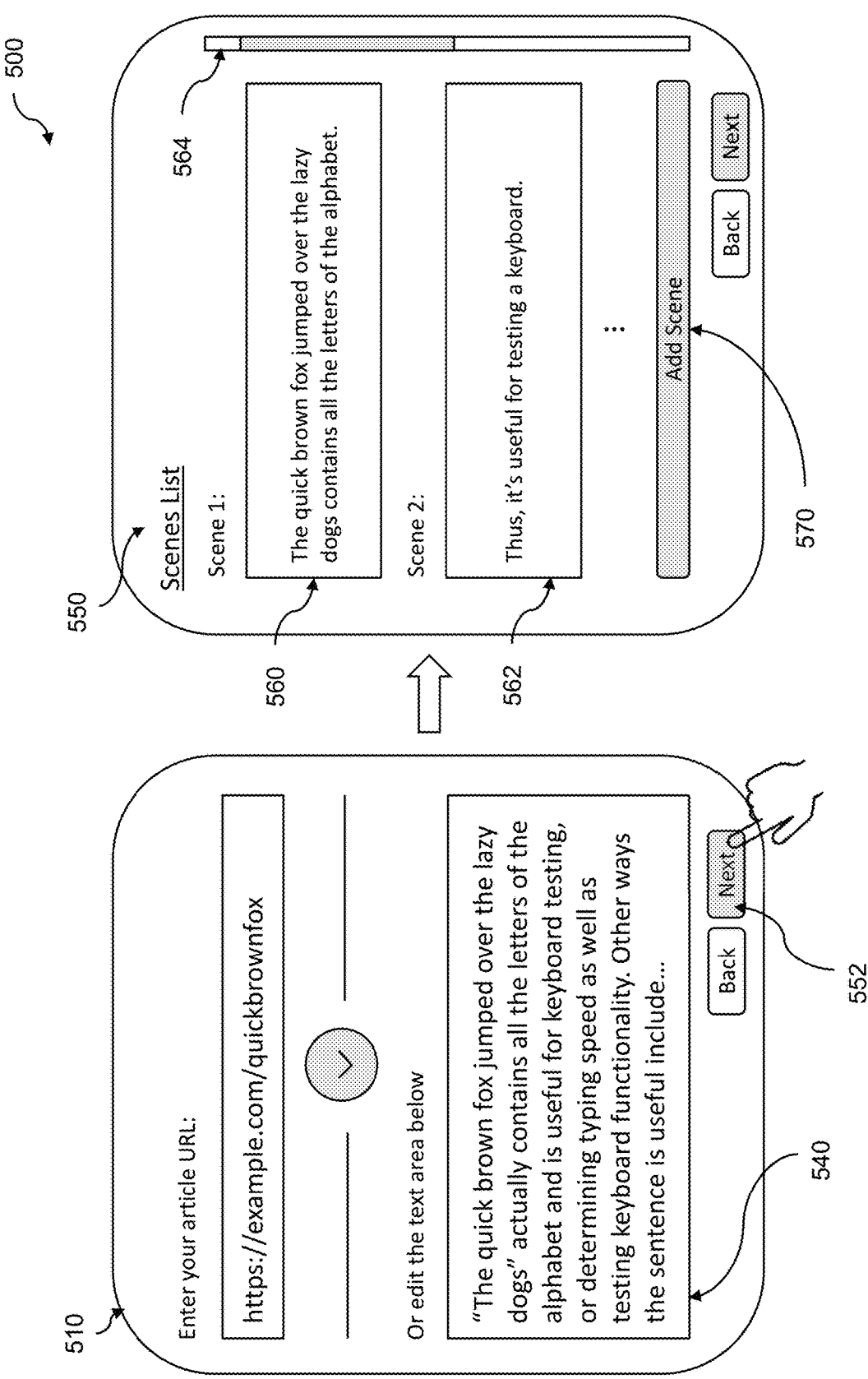
FIG. 5 is a diagram showing picking summary sentences and generating scenes.

FIG. 5 is a diagram showing picking summary sentences and generating scenes. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video. In the diagram 500, user interface 510 is similar to user interface 450 from FIG. 4. The user has the opportunity to edit the text in text field 540 if desired. When the Next button 552 is invoked, the user interface 550 results, which shows a scene list. The summary sentence shown in text field 560 corresponds to a first scene of the short-form video that is to be created. The summary sentence shown in text field 562 corresponds to a second scene of the short-form video that is to be created. Multiple scenes can be displayed in the scenes list. A scroller control 564 can be used to scroll to additional scenes. An Add Scene control 570 can be invoked to add a scene at a desired location. The user interface 550 can enable scenes to be added, deleted, edited, and/or reordered.

Figure 6:
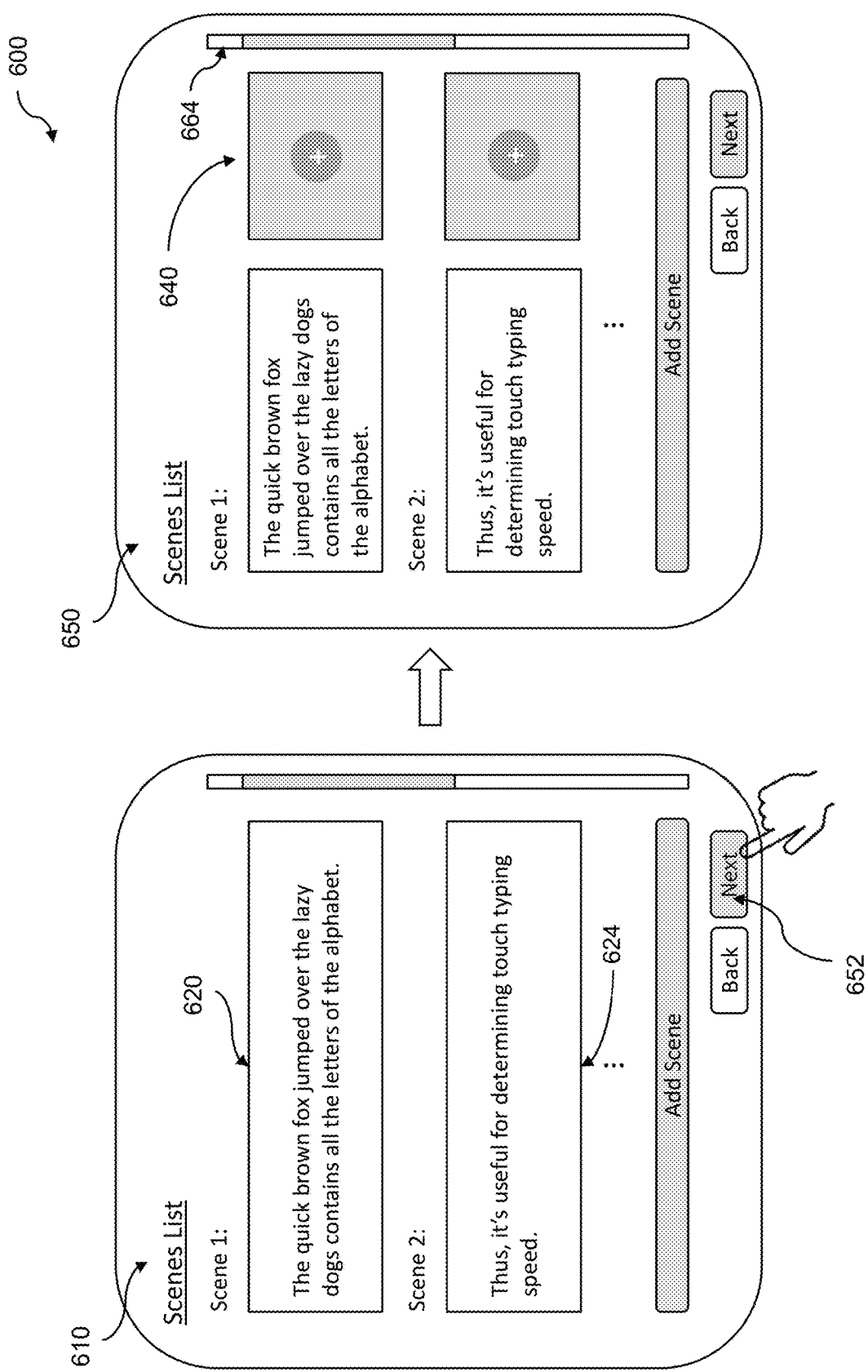
FIG. 6 is a diagram showing accessing media asset selection.

FIG. 6 is a diagram which shows accessing media asset selection. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video. In the diagram 600, user interface 610 is similar to user interface 550 from FIG. 5. However, in this example, the text for scene 2, as indicated at 624 has been edited by a user, as compared with the text indicated at 562 of FIG. 5. In contrast, the text indicated at 620 is unedited as compared with the computer-generated summary sentence shown at 560 in FIG. 5. Disclosed embodiments provide the flexibility to allow user editing during the short-form video creation process. Thus, in embodiments, the summary sentences and the list of video scenes are edited by the user. This serves to increase the likelihood that the finished artifact (the completed short-form video) is ready to use in an ecommerce application. When the user is satisfied with the descriptive text in each scene text field, the Next button 652 is invoked, causing the user interface 650 to result. User interface 650 shows a column of expandable media asset selection widgets 640. An expandable media asset selection widget is created for each scene in the scene list. A scroller control 664 can be used to scroll to additional scenes.

Figure 7:
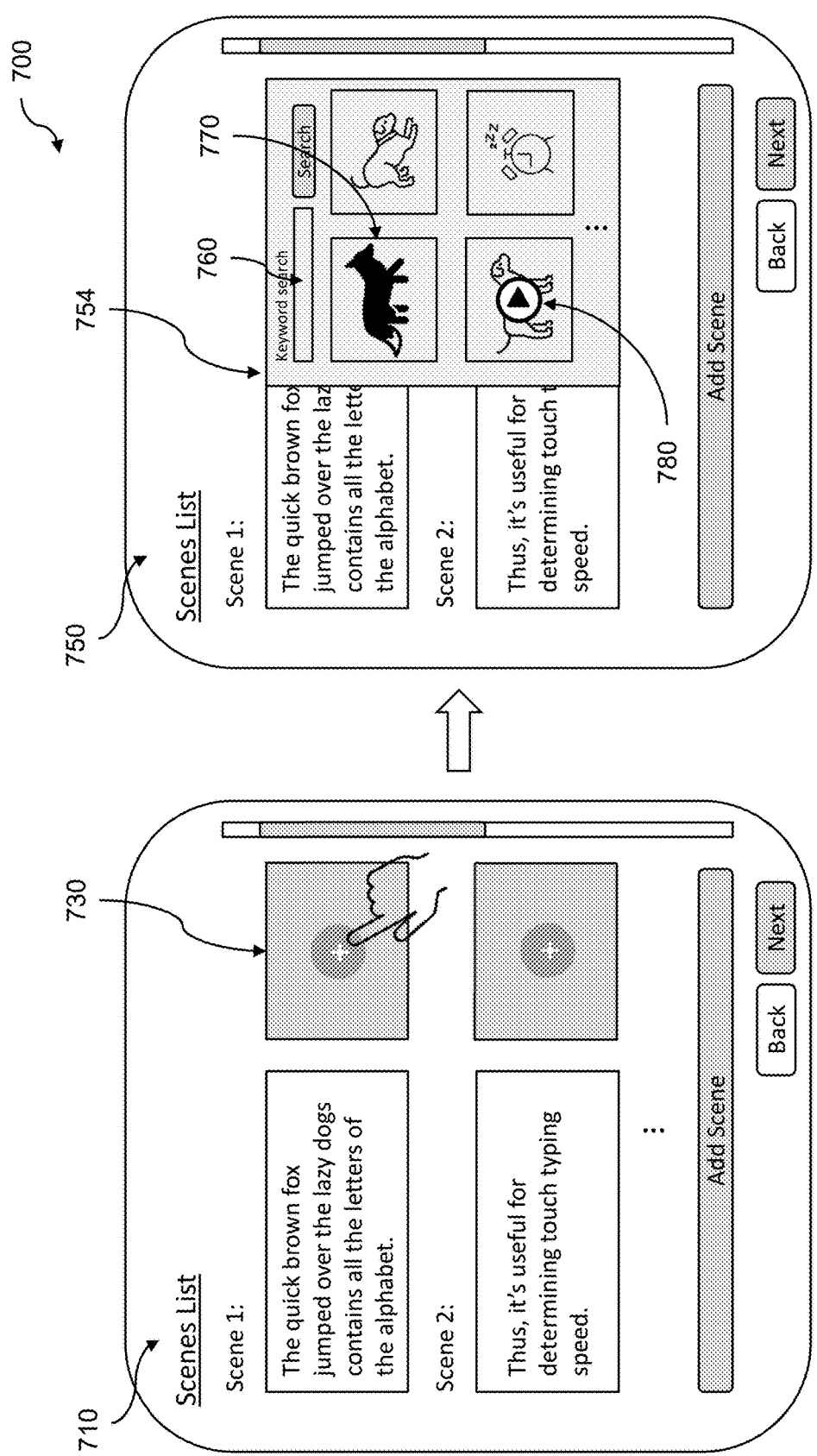
FIG. 7 is a diagram showing choosing a media asset from a media asset library.

FIG. 7 is a diagram which shows choosing a media asset from a media asset library. In the diagram 700, user interface 710 is similar to user interface 650 from FIG. 6. Invoking expandable media asset selection widget 730 results in the user interface 750. Expanded media asset selection widget 754 shows the expandable media asset selection widget 730 in its expanded state. As shown in the user interface 750, the expandable media asset selection widget shows multiple media assets. The multiple media assets can include still images such as 770, as well as video clips, such as indicated at 780. Embodiments can provide the feature of building an image of the media asset overlaid with the single summary sentence. A user can select one or more of these media assets for inclusion in a video scene. Additionally, some embodiments may enable additional searching of media assets based on keywords entered in search field 760. Additional configuration options may also be provided, such as selection of audio files to be used for a soundtrack of the short-form video. The audio files can include sound effects, music, and/or voiceover tracks. Configuration options can include transition effects used to segue from one media asset to another media asset. Configuration options can include additional visual effects to be applied to a media asset. These effects can include, but are not limited to, blurring, posterizing, contrast enhancement, recoloring, mirroring, and/or other visual effects. Disclosed embodiments provide the feature of allowing a user to configure the picking summary sentences, the generating a list of video scenes, and the choosing a media asset.

Figure 8:
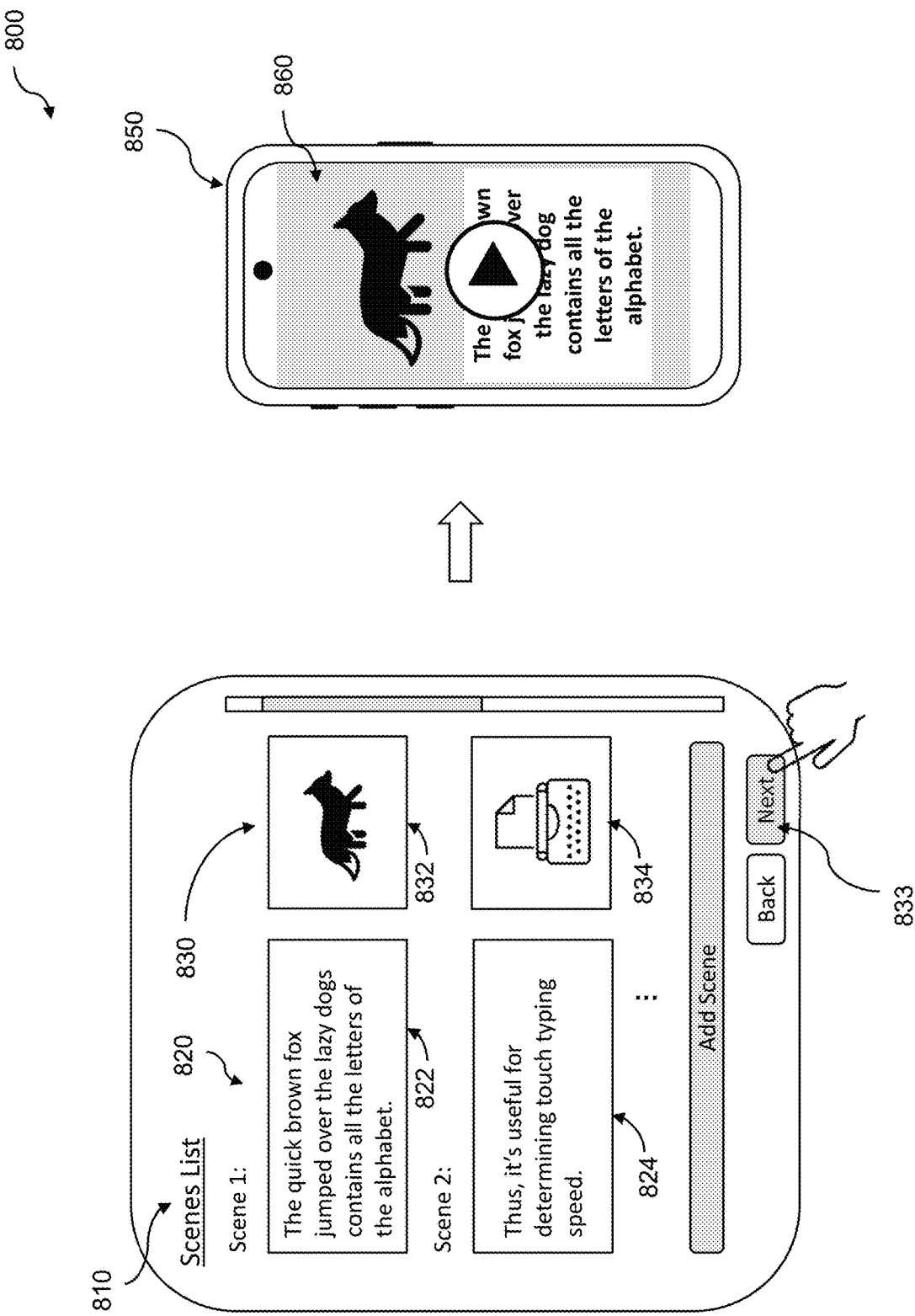
FIG. 8 is a diagram showing compiling video scenes into a short-form video.

FIG. 8 is a diagram showing compiling video scenes into a short-form video. Text from a website is extracted to generate extracted text. Possible summary sentences are formed from the extracted text. The forming is based on natural language processing. The summary sentences are ranked according to an engagement metric. Summary sentences from the possible summary sentences are picked based on a threshold engagement metric value. A list of video scenes is generated based on the summary sentences. Each video scene is associated with a summary sentence. A media asset from a media asset library is chosen for each video scene within the list of video scenes. The choosing is accomplished by machine learning. The list of video scenes, including the media asset that was chosen for each video scene, is compiled into a short-form video. In the diagram 800, user interface 810 is similar to user interface 750 of FIG. 7. However, in this example, each scene in column 820 has a corresponding media asset selected, as shown in column 830. In the example, the scene corresponding to the summary sentence in field 822 is associated with the media asset represented at 832. That media asset shows an image of a fox, which corresponds to the summary sentence in field 822, which includes the word "fox". Similarly, the scene corresponding to the summary sentence in field 824 is associated with the media asset represented at 834. The media asset 834 shows an image of a typewriter, which corresponds to the summary sentence in field 824, which includes the word "typing". Invoking the Next button 833 causes the media assets listed in column 830 to be compiled together to create a short-form video 860, which can be rendered on an electronic device 850. The electronic device 850 can include a smartphone, tablet computer, laptop computer, smartwatch, and/or another suitable device.

Figure 9:
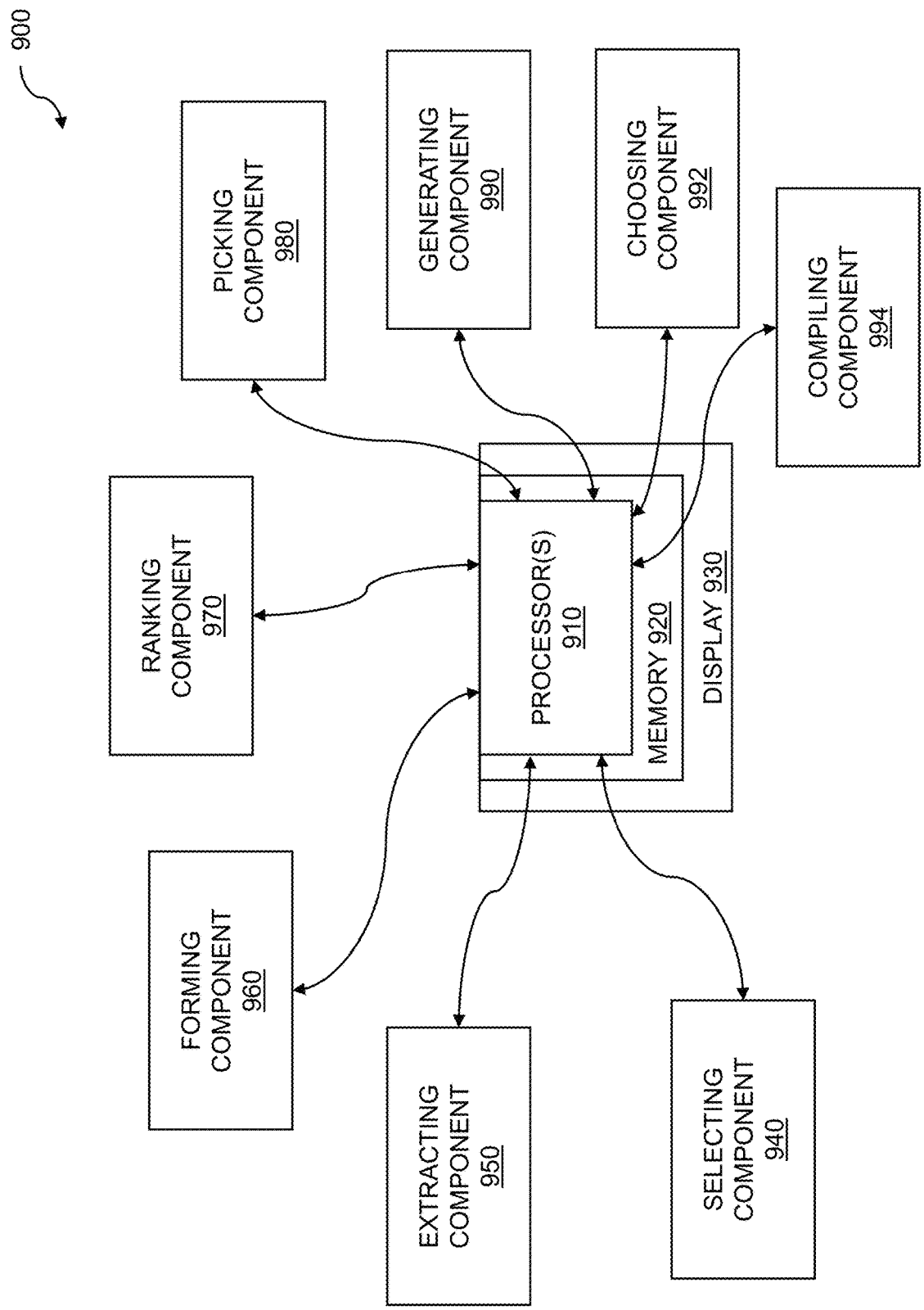
FIG. 9 is a system diagram for text-driven AI-assisted short-form video creation in an ecommerce environment.

FIG. 9 is a system diagram for text-driven AI-assisted short-form video creation in an ecommerce environment. The system 900 can include one or more processors 910 coupled to a memory 920 which stores instructions. The system 900 can include a display 930 coupled to the one or more processors 910 for displaying data, video streams, videos, product information, virtual purchase cart contents, webpages, video templates, media assets, expandable media asset selection widgets, intermediate steps, instructions, and so on. In embodiments, one or more processors 910 are coupled to the memory 920 where the one or more processors, when executing the instructions which are stored, are configured to: extract text from a website to generate extracted text; form, from the extracted text, possible summary sentences, wherein the forming is based on natural language processing; rank the possible summary sentences according to an engagement metric; pick summary sentences from the possible summary sentences based on a threshold engagement metric value; generate a list of video scenes based on the summary sentences, wherein each video scene is associated with a summary sentence; choose a media asset, from a media asset library, for each video scene within the list of video scenes, wherein choosing is accomplished by machine learning; and compile the list of video scenes, including the media asset that was chosen for each video scene, into a short-form video. In embodiments, a target platform can include smartphones, smartwatches, tablet computers, laptop computers, desktop computers, smart televisions, etc.

The system 900 can include a selecting component 940. The selecting component 940 can include functions and instructions for selecting a video template. The selecting can be based on a target platform. The target platform can include, but is not limited to, smartphones, smartwatches, tablet computers, laptop computers, desktop computers, smart televisions, and so on. The video templates can include rules, constraints, and preferences used in the generation of short-form videos. The video templates can serve to further accelerate the creation of short-form videos by establishing rules, constraints, and preferences prior to creation of a short-form video. Video template elements can include a duration, a resolution, an orientation, a language preference, an audio preference, transition preferences, special effects preferences, and/or other relevant information pertaining to a short-form video.

The system 900 can include an extracting component 950. The extracting component 950 can include functions and instructions for extracting text from a website or other source. The text can be ASCII text, UTF-8 text, Unicode text, and/or another suitable format. Text embedded in images may not be directly extractable. The extracting component 950 can include optical character recognition (OCR) processing capability in order to extract text that is embedded in images on a website.

The system 900 can include a forming component 960. The forming component 960 can include functions and instructions for forming summary sentences from the text provided by the extracting component 950. The forming may include using NLP. The forming may include tokenization, word frequency analysis, and/or computing a normalized word frequency analysis. In embodiments, the forming of summary sentences may include additional preprocessing of the text. The additional preprocessing can include a stemming process to reduce words into their root forms. Additionally, a list of stop words may be used for further scrubbing the text by removing commonly used words such as articles, prepositions, and pronouns. In some embodiments, sentences and/or phrases may be scored based on the normalized word frequency analysis. Phrases that score higher than a predetermined threshold may be selected as possible summary sentences. Embodiments can further include computing sentence thresholds. Each sentence may be scored, and an average sentence score can be computed. Sentences with a score above a predetermined threshold (e.g., scoring in the top quartile) are selected as summary sentences. Additional NLP functions, such as entity detection and/or disambiguation, may also be performed by the forming component 960 to further refine the resulting possible summary sentences.

The system 900 can include a ranking component 970. The ranking component 970 can include functions and instructions for ranking the possible summary sentences output by the forming component 960, according to an engagement metric. In embodiments, the engagement metric can be based on a list of trending words, phrases, and/or topics. The list of trending words may be obtained from a search engine, or derived from scraping popular websites, news feeds, social media posts, and so on. An engagement score may be derived by adding a point for each word in the sentence that is deemed to be a trending word. In some embodiments, the engagement metric is based on a named entity recognition model. The named entity recognition model can include words such as a brand name, a city (or other geographical location), a retail establishment, or the name of a celebrity. The engagement metric can be based on an image of a celebrity in the website. In embodiments, the image of the celebrity is identified using machine-learning based facial recognition.

The system 900 can include a picking component 980. The picking component 980 can include functions and instructions for picking summary sentences from the possible summary sentences based on a threshold engagement metric value and the ranking of the summary sentences as output by the ranking component 970. As an example, if a sentence has a score in the top quartile of all sentences within a website, it may be picked by the picking component 980. In embodiments, a user has the opportunity to customize the selections output by the picking component. This can include editing, adding, deleting, and/or reordering summary sentences that are used for video scenes. In embodiments the picking summary sentences is limited in number to a predefined value. The predefined value can be in the range of three to ten in some embodiments. In some embodiments, the predefined value can be based on duration, such as x summary sentences per minute of video. Thus, if x=4, and the requested length of the short-form video is 2.5 minutes, then the predefined value is 2.5*4=10 summary sentences.

The system 900 can include a generating component 990. The generating component 990 can include functions and instructions for generating a list of video scenes based on the summary sentences, wherein each video scene is associated with a summary sentence that was output by picking component 980. The list of video scenes can be based on the top-ranked n summary sentences. The value of n can be specified by a user, and/or set as a default in a video template selected by selecting component 940. As an example, when the value of n is set to five, the top five ranked summary sentences as output by picking component 980 can each be used to create a scene within a generated short-form video. Embodiments enable a user to edit the scene list. The editing can include adding, editing, deleting, and/or reordering scenes.

The system 900 can include a choosing component 992. The choosing component 992 can include functions and instructions for choosing a media asset, from a media asset library, for each video scene within the list of video scenes, wherein the choosing is accomplished by machine learning. The choosing can include using keywords from the summary sentences to perform a media asset search. The search can include an image-based search. The searching of images can be based on metadata, such as manually tagged descriptions of images and/or videos. The searching of images can be based on machine learning utilizing image classifiers. As an example, when searching for images based on the keyword "fox", the search can utilize an ML-based search engine that has been trained to identify images of foxes, even if no metadata or other textual information indicates what is in the image. This approach enables a rich selection of media assets to be chosen for inclusion in a generated short-form video. Embodiments enable a user to customize the media assets, which can include adding, deleting, reordering, and/or editing media assets. The editing of a media asset can include selecting a particular excerpt from a video, applying a special effect to a video or image, and/or editing other changeable parameters associated with a media asset.

The system 900 can include a compiling component 994. The compiling component 994 can include functions and instructions for compiling the list of video scenes, including the media asset that was chosen for each video scene by the choosing component 992, into a short-form video. The compiling component can include a variety of video codecs and audio codecs for generating short-form videos in a variety of formats. The formats can include, but are not limited to, MP4 (MPEG-4), MOV (QuickTime Movie), WMV (Windows Media Viewer), AVI (Audio Video Interleave), MKV, AVCHD, and/or other suitable formats. The compiling component can include text generation capabilities for adding titles, subtitles, and/or ending credits to a short-form video. The compiling component can include a transition engine for applying a transition to segue between two adjacent media assets. The transitions can include wipes, fades, dissolves, and/or other suitable transition types. The compiling component can further include audio processing. The audio processing can include performing equalization and/or compression. When media assets have varying sound levels, the audio processing can perform a normalization such that the audio level is consistent throughout the short-form video. In some embodiments, the compiling component may include a mosaic function to enable multiple media assets to be rendered simultaneously. The simultaneous rendering can include rendering two videos side by side, four videos in quadrants, and so on. The compiling component can include effects processing for media assets. The effects processing can include recoloring media assets, background swapping of media assets, reverse playback of media assets, mirroring of media assets, and/or other suitable effects processing. The aforementioned capabilities of the compiling component can be used to create compelling and engaging short-form videos with a reduced creation time, thereby improving the technical fields of video analysis, video creation, and information dissemination.

The system 900 can include a computer program product embodied in a non-transitory computer readable medium for video analysis, the computer program product comprising code which causes one or more processors to perform operations of: extracting text from a website to generate extracted text; forming, from the extracted text, possible summary sentences, wherein the forming is based on natural language processing; ranking the possible summary sentences according to an engagement metric; picking summary sentences from the possible summary sentences based on a threshold engagement metric value; generating a list of video scenes based on the summary sentences, wherein each video scene is associated with a summary sentence; choosing a media asset, from a media asset library, for each video scene within the list of video scenes, wherein the choosing is accomplished by machine learning; and compiling the list of video scenes, including the media asset that was chosen for each video scene, into a short-form video.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions generally referred to herein as a "circuit", "module", or "system"—may be implemented by computer program instructions, by special-purpose hardware-based computer systems, by combinations of special purpose hardware and computer instructions, by combinations of general-purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM); an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States, then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for video analysis comprising:
   extracting text, using one or more processors, from a website to generate extracted text;
   forming, from the extracted text, possible summary sentences, wherein the forming is based on natural language processing;
   ranking the possible summary sentences according to an engagement metric;
   picking summary sentences from the possible summary sentences based on a threshold engagement metric value;
   generating a list of video scenes based on the summary sentences, wherein each video scene is associated with a summary sentence;
   choosing a media asset, from a media asset library, for each video scene within the list of video scenes, wherein the choosing is accomplished by machine learning; and
   compiling the list of video scenes, including the media asset that was chosen for each video scene, into a short-form video.

2. The method of claim 1 further comprising extracting media from the website.

3. The method of claim 2 further comprising including the media that was extracted into the short-form video.

4. The method of claim 1 wherein the compiling includes a dynamically generated image in the short-form video.

5. The method of claim 4 wherein the dynamically generated image includes a synthesized video.

6. The method of claim 1 further comprising selecting a video template, from a library of video templates, wherein the video template is a base into which the list of video scenes is compiled.

7. The method of claim 6 further comprising determining custom information required in the video template.

8. The method of claim 7 further comprising examining the summary sentences to provide the custom information.

9. The method of claim 1 wherein the choosing a media asset is based on behavior tagging.

10. The method of claim 1 wherein the forming of possible summary sentences is based on contextual information from the website.

11. The method of claim 1 wherein the engagement metric is based on metadata associated with the website.

12. The method of claim 1 wherein the picking summary sentences further comprises analyzing semantic importance of the possible summary sentences.

13. The method of claim 1 wherein the picking summary sentences is limited in number to a predefined value.

14. The method of claim 1 further comprising training a machine learning model, for the machine learning, with videos that were previously compiled.

15. The method of claim 1 further comprising allowing a user to configure the picking summary sentences, the generating a list of video scenes, and the choosing a media asset.

16. The method of claim 15 wherein the summary sentences and the list of video scenes are edited by the user.

17. The method of claim 15 wherein the user augments a search from the media asset library.

18. The method of claim 1 wherein the engagement metric is based on a named entity recognition model.

19. The method of claim 18 further comprising recognizing that a celebrity is named in the possible summary sentences, wherein the engagement metric is increased.

20. The method of claim 1 wherein the engagement metric is based on an image of a celebrity in the website.

21. The method of claim 1 further comprising enabling an ecommerce purchase within the short-form video that was compiled, wherein the ecommerce purchase is accomplished within the short-form video that was compiled.

22. The method of claim 21 further comprising selecting a product for sale based on the summary sentences or the media asset.

23. The method of claim 1 wherein the picking summary sentences comprises a single summary sentence.

24. The method of claim 23 further comprising building an image of the media asset overlaid with the single summary sentence.

25. A computer program product embodied in a non-transitory computer readable medium for video analysis, the computer program product comprising code which causes one or more processors to perform operations of:
   extracting text from a website to generate extracted text;
   forming, from the extracted text, possible summary sentences, wherein the forming is based on natural language processing;
   ranking the possible summary sentences according to an engagement metric;
   picking summary sentences from the possible summary sentences based on a threshold engagement metric value;
   generating a list of video scenes based on the summary sentences, wherein each video scene is associated with a summary sentence;
   choosing a media asset, from a media asset library, for each video scene within the list of video scenes, wherein the choosing is accomplished by machine learning; and
   compiling the list of video scenes, including the media asset that was chosen for each video scene, into a short-form video.

26. A computer system for video analysis comprising:
   a memory which stores instructions;
   one or more processors coupled to the memory wherein the one or more processors, when executing the instructions which are stored, are configured to:
   extract text from a website to generate extracted text;
   form, from the extracted text, possible summary sentences, wherein the forming is based on natural language processing;
   rank the possible summary sentences according to an engagement metric;
   pick summary sentences from the possible summary sentences based on a threshold engagement metric value;
   generate a list of video scenes based on the summary sentences, wherein each video scene is associated with a summary sentence;
   choose a media asset, from a media asset library, for each video scene within the list of video scenes, wherein choosing is accomplished by machine learning; and
   compile the list of video scenes, including the media asset that was chosen for each video scene, into a short-form video.

* * * * *